United States Patent [19]
Yang

[11] Patent Number: 6,160,857
[45] Date of Patent: Dec. 12, 2000

[54] DEMODULATOR FOR FREQUENCY SHIFT KEYING SIGNALS

[75] Inventor: Chung-Gil Yang, Seoul, Rep. of Korea

[73] Assignee: Samsung Electronics Co., Ltd., Kyungki-do, Rep. of Korea

[21] Appl. No.: 09/103,833

[22] Filed: Jun. 24, 1998

[30] Foreign Application Priority Data

Nov. 18, 1997 [KR] Rep. of Korea ........................ 97-60888

[51] Int. Cl.[7] .............................. H03D 3/00; H04L 27/14
[52] U.S. Cl. ................................ 375/334; 329/300
[58] Field of Search ................................... 375/334, 337, 375/272; 329/300, 301, 302, 330

[56] References Cited

U.S. PATENT DOCUMENTS

| | | | |
|---|---|---|---|
| 4,574,247 | 3/1986 | Jacob | 329/300 |
| 4,785,255 | 11/1988 | Lucak et al. | 329/303 |
| 4,897,857 | 1/1990 | Wakatsuki et al. | 375/317 |
| 5,469,112 | 11/1995 | Lee | 329/302 |

*Primary Examiner*—Don N. Vo
*Assistant Examiner*—Phuong Phu
*Attorney, Agent, or Firm*—F. Chau & Associates, LLP

[57] ABSTRACT

Disclosed is a frequency shift keying (FSK) signal demodulator which demodulates binary data encoded in FSK format. A square wave generator generates a continuously repeating square wave signal by detecting zero-crossings of an FSK-modulated signal having a first frequency and a second frequency. The square wave signal is sampled at a sampling rate. A counter and its control circuit counts the number of the sampled signals during 1 bit data transmission time slots. A comparator compares the count number with two predetermined reference values and outputs the binary data.

16 Claims, 2 Drawing Sheets

DEMODULATOR FOR FREQUENCY SHIFT KEYING SIGNALS

FIELD OF THE INVENTION

The present invention relates to a demodulator for a data transmission system and, more particularly, to an FSK (Frequency Shift Keying) signal demodulator suitable for digital integrated circuits.

BACKGROUND OF THE INVENTION

In digital communications, it is necessary to modulate binary information and to transmit it over a communication channel. This channel may be a hard-wired channel or a radio channel.

One method of modulating binary information is frequency shift keying (FSK). In FSK, the carrier frequency is switched or keyed between two values of frequency. One application in which FSK is used is caller identification (CID) services provided by telephone companies. The CID services deliver information such as a caller's telephone number and/or name to a called subscriber's telephone at the beginning of a call. In most countries, the caller identity data stream is transmitted in 1.2 Kbps Bell 202 standard or CCITT V0.23 FSK format. In such FSK format, a one "1" is represented by a first frequency (e.g., 1.2 KHz) of a carrier signal, which is typically a sinusoidal waveform, and a zero "0" is represented by a second frequency (e.g., 2.2 KHz) of the carrier signal. The FSK signal is transmitted via a hard-wired channel (i.e., telephone line) to a telephone set of a called subscriber. The transmitted signal has two frequencies reflecting the binary information to be transmitted over time. The called subscriber's telephone set demodulates the FSK-modulated signal and displays the CID information on a display device such as an LCD or the like.

Such demodulators for CID (caller identification) systems are typically implemented by analog-to-digital (A/D) converters. The A/D converters contribute to the increased demodulator chip size and complexity of the hardware.

SUMMARY OF THE INVENTION

It is therefore an object of the present invention to provide a frequency shift keying (FSK) signal demodulator which has simple hardware.

According to an aspect of the present invention, there is provided a frequency shift keying (FSK) signal demodulator which includes a square wave generator for generating square wave signal having first and second periods corresponding to a first frequency and a second frequency of an FSK-modulated signal, said first frequency and second frequency representing first and second signal levels of binary data, a sampler for sampling the square wave signal at a predetermined sampling rate to output a train of sampled signals, a data clock extractor for generating impulse signals whenever a first edge of the square wave signal in either a mark or a space term of the FSK-modulated signal is detected, a counter for counting the number of the sampled signals in response to the impulse signals, and a comparator for comparing the count number with two predetermined reference values to output binary data.

The demodulator preferably comprises a band pass filter for filtering the FSK-modulated signal and providing the filtered signal to the square wave generator. The demodulator is preferably suitable for implementation in a VLSI and used in a telephone for demodulating FSK modulated signal, including FSK signal having caller identification information.

According to one embodiment of the invention, the demodulator's first frequency is about 1.2 KHz and the second frequency is about 2.2 KHz and the counter is counted at a clock rate of about 1.584 MHz. The two reference values are preferably selected deviations from a count of sampled signals in a mark term and the comparator outputs a DATA '1' when the count number is between the two reference values.

A method according to the present invention for demodulating a frequency shift keying signal (FSK) comprises the steps of generating a continuously repeating square wave signal by detecting zero-crossings of an FSK-modulated signal having a first frequency and second frequency, sampling the square wave signal at a predetermined sampling rate to output a train of sampled signals, counting a number of the sampled signals during 1-bit data transmission time slots, and comparing the count number of the sampled signals with two predetermined reference values to output binary data.

The method further comprises the steps of filtering the FSK-modulated signal having a first frequency and a second frequency and providing the filtered signal to generate the square wave signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

A caller identification (CID) system of 1.2 Kbps transmission speed is used to illustrate a preferred embodiment according to the present invention. At such speed, a one ("1") can be represented by a frequency of 1.2 KHz and a zero ("0") can be represented by another frequency, e.g., at 2.2 KHz. A carrier signal in a mark term of 1.2 KHz is in phase with respect to itself in the preceding mark term, but the carrier signal in a space term of 2.2 KHz is shifted to the right by 60 degrees with respect to itself in the preceding space term. Accordingly, the width of a mark pulse representing a one ("1") is not equal to that of a space pulse representing a zero ("0") when the FSK signal is demodulated by using zero-crossing.

Figure 1:
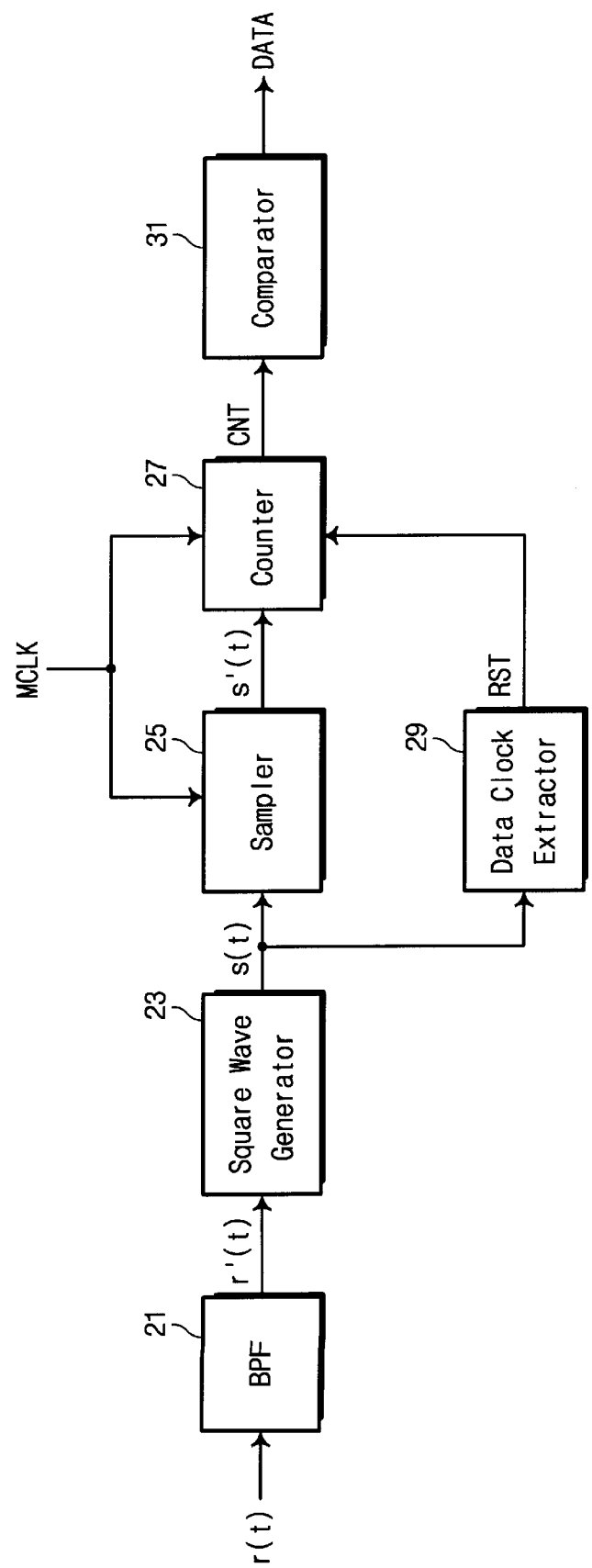
FIG. 1 is a block diagram showing an embodiment of the present invention.
Figure 2:
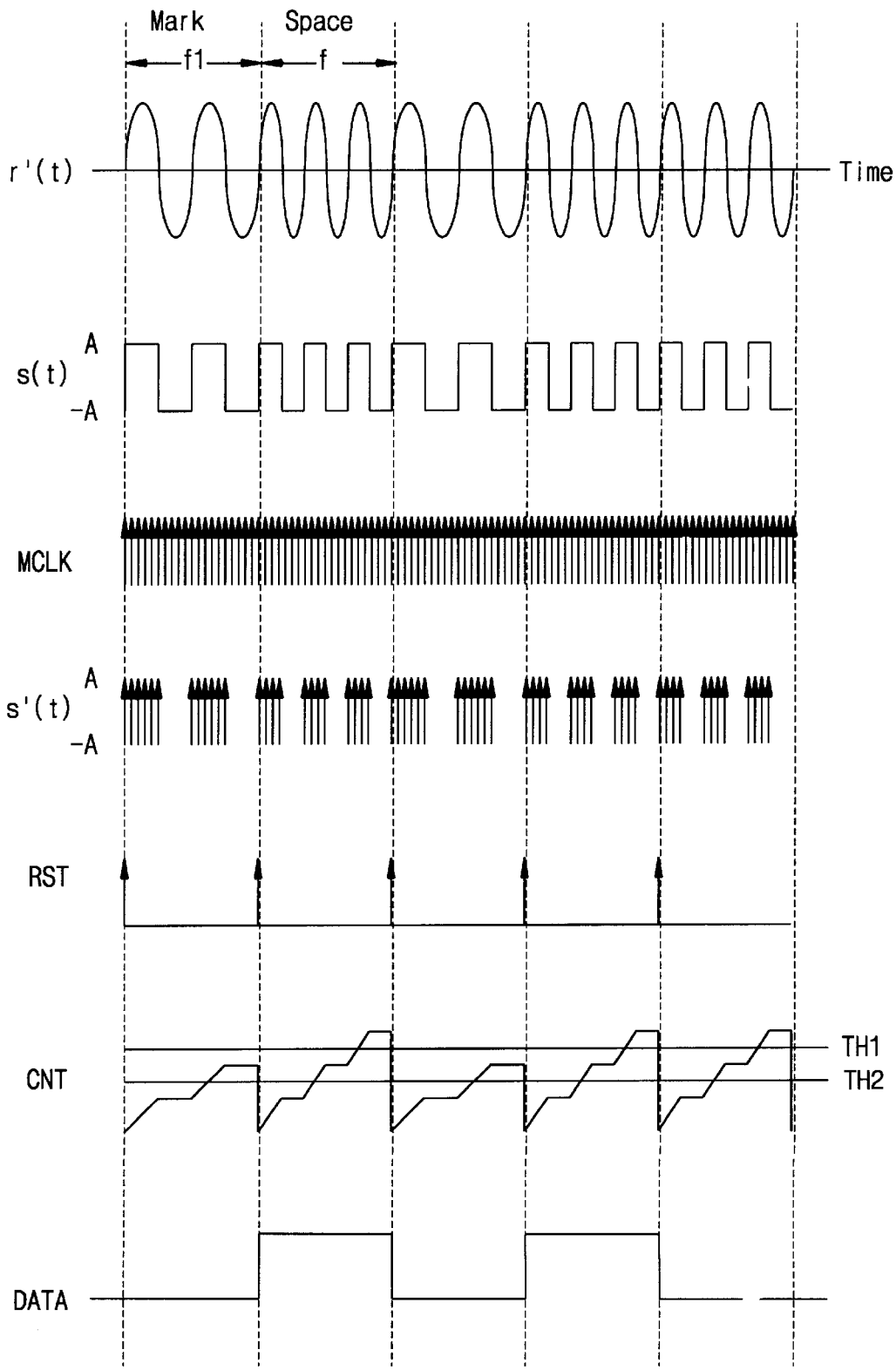
FIG. 2 is a waveform diagram for the components of FIG. 1.

FIG. 1 shows an embodiment of a FSK demodulator for a CID (caller identification) system according to the present invention, and FIG. 2 is a waveform diagram for the components of FIG. 1.

Referring to FIGS. 1 and 2, an FSK-modulated signal r(t) is input to a band pass filter (BPF) 21. The FSK-modulated signal has a first frequency $f_1$ (e.g., 1.2 KHz) when it corresponds to a "1" bit, and it has a second frequency $f_2$ (e.g., 2.2 KHz) when it corresponds to a "0" bit. The selection of bit values for carrier frequencies $f_1$ and $f_2$ is arbitrary, but must be used consistently once selected. The BPF 21 preferably has a bandwidth from the first frequency $f_1$ to the second frequency $f_2$. The BPF 21 removes White Gaussian noise of a communication channel.

The filtered signal r'(t) is provided to a square wave generator 23 including a zero-crossing detector (not shown). The square wave generator 23 detects the zero crossings of filtered signal r'(t) and generates a continuously repeating square wave signal s(t) having signal levels of −A to A and a duty cycle of 0.5.

The square wave signal s(t) is applied to a sampler 25. The sampler 25 is clocked by clock signal MCLK to sample the square wave signal s(t). The clock frequency of MCLK is one of the common multiples of the first ($f_1$) and the second ($f_2$) frequencies. Thus, a train of sampled impulse signals s'(t) is outputted from the sampler 25. It can be seen that as the clock rate and thus the sampling rate increases, the waveform of the sampled signals s'(t) becomes more like the square wave signal s(t). In this illustrative embodiment, with the carrier signal frequencies of 1.2 KHz and 2.2 KHz, the square wave signal s(t) is preferably sampled at a sampling rate of about 1.584 MHz, or at 120 times the least common multiple (i.e., 13.2 KHz) of the two frequencies.

The square wave signal s(t) is also provided to a data clock extractor 29. The data clock extractor 29 generates an impulse signal RST when it detects the first edge of the square wave signal s(t) in either the mark or the space term of the FSK-modulated signal r'(t). The frequency of the impulse signal is about 0.6 KHz.

The train of the sampled impulse signals s'(t) is provided to a counter 27. The counter 27 counts the number of the sampled impulse signals s'(t) in synchronization with the clock signal MCLK of 1.584 MHZ during each 1bit data transmission time slot. The number of the sampled impulse signals in a mark term (i.e., of 1.2 KHz) is fixed to 660. But, the number of the sampled impulse signals in a space term (i.e., of 2.2 KHz) is either 600 or 720 since the carrier signal in the space term is shifted to the right by 60 degrees with respect to itself in the preceding space term. The counter 27 may be any type of conventional counter, but is preferably an 11 bit or more binary counter. The counter 27 is reset by the signal RST from the data clock extractor 29.

The output CNT of the counter 27 is provided to a comparator 31. The comparator 31 compares the count output CNT with two reference values TH1 and TH2, the reference values being dependent upon the selected frequencies of the FSK-modulated signal. For example, the boundaries of TH1 and TH2 for a 1.2 Kbps data stream are 660<TH1≦720, 600≦TH2<660. The comparator 31 outputs a DATA of '1' when TH2<CNT<TH1, but outputs DATA of '0' when CNT≧TH1 or CNT≦TH2.

Alternatively, the reference values TH1 and TH2 can be set at a selected deviation from a count of sampled impulse signals in a mark term. For example, at a deviation of 10 from 660, TH1 and TH2 are about 670 and about 650, respectively. In such case, when comparator 31 determines that CNT is between TH1 and TH2, it outputs a DATA of '1'. If CNT is outside of the range between TH1 and TH2, the comparator outputs a DATA of '0'. Therefore, the FSK-modulated signal r(t) is demodulated into binary data signal DATA in accordance with the present invention.

The embodiments described herein are merely illustrative of the preferred embodiments and of the principles of the present invention. Various modifications may be made to the invention by those persons ordinarily skilled in the art, without departing from the true scope or spirit of the present invention. For example, frequencies other than 1.2 KHz and 2.2 KHz for $f_1$ and $f_2$ are contemplated for use with the present invention. In addition, many modifications may be made to adapt a particular situation to the teaching of the present invention without departing from the central scope thereof. Therefore, it is not intended that the present invention be limited to the particular embodiment disclosed as the best mode contemplated for carrying out the present invention, but rather that the present invention includes all embodiments falling within the scope of the appended claims.

What is claimed is:

1. A frequency shift keying (FSK) signal demodulator comprising:
   means for generating a continuously repeating square wave signal by detecting zero-crossings of an FSK-modulated signal having a first frequency and a second frequency;
   means for sampling the square wave signal at a predetermined sampling rate to output a train of sampled signals;
   means for counting a number of the sampled signals during 1-bit data transmission time slots; and
   means for comparing the count number of the sampled signals with two predetermined reference values to output binary data.

2. The demodulator according to claim 1, further comprising means for bandpass filtering the FSK-modulated signal and providing the filtered signal to said means for generating the square wave signal.

3. The demodulator according to claim 1, wherein said means for counting includes a data clock extractor for extracting a signal representing 1-bit data transmission time slots of said FSK signal.

4. The demodulator according to claim 3, wherein said means for counting includes a counter having a reset which resets upon occurrence of said signal extracted by said data clock extractor.

5. The demodulator according to claim 1, wherein said output binary data is a first value when said count number is between the two predetermined reference values and said output binary data is a second value when the count number is otherwise.

6. A frequency shift keying (FSK) signal demodulator comprising:
   a square wave generator for generating a square wave signal having first and second periods corresponding to a first frequency and a second frequency of an FSK-modulated signal, said first frequency and second frequency representing first and second signal levels of binary data;
   a sampler for sampling the square wave signal at a predetermined sampling rate to output a train of sampled signals;
   a data clock extractor for generating impulse signals whenever a first edge of the square wave signal in either a mark or a space term of the FSK-modulated signal is detected;
   a counter for counting the number of the sampled signals in response to the impulse signals; and
   a comparator for comparing the count number with two predetermined reference values to output binary data.

7. The demodulator according to claim 6, further comprising a band pass filter for filtering the FSK-modulated signal and providing the filtered signal to the square wave generator.

8. The demodulator according to claim 6, wherein said demodulator is used in a telephone for demodulating FSK-modulated caller identification information.

9. The demodulator according to claim 6, wherein said first frequency is about 1.2 KHz and said second frequency is about 2.2 KHz and said counter is counted at a clock rate of about 1.584 MHz.

10. The demodulator according to claim 9, wherein said two reference values are selected deviations from about a count of sampled signals in a mark term and the comparator outputs a DATA '1' when the count number is between the two reference values.

11. The demodulator according to claim 9, wherein said first of two reference values (TH1) is between 660 and 720 and the second of the two reference values (TH2) is between 600 and 660 and said comparator outputs a binary DATA '0' when the count number CNT is TH2<CNT<TH1.

12. The demodulator according to claim 6, wherein said square wave generator generates said square wave at a duty cycle of about 0.5.

13. A method for demodulating a frequency shift keying signal (FSK) comprising the steps of:

generating a continuously repeating square wave signal by detecting zero-crossings of an FSK-modulated signal having a first frequency and a second frequency;

sampling the square wave signal at a predetermined sampling rate to output a train of sampled signals;

counting a number of the sampled signals during 1-bit data transmission time slots; and comparing the count number of the sampled signals with two predetermined reference values to output binary data.

14. The method of claim 13, further comprising the steps of filtering the FSK-modulated signal having a first frequency and a second frequency and providing the filtered signal to generate the square wave signal.

15. The method of claim 13 wherein the first frequency is about 1.2 KHz and the second frequency is about 2.2 KHz.

16. The method according to claim 13 further comprising the steps of:

outputting a first digital value if the number of counts is between two reference values; and otherwise outputting a second digital value.

* * * * *